May 18, 1926.

H. T. KINGSBURY

TOY WHEEL

Filed May 26, 1922

1,584,778

Inventor
Harry T. Kingsbury
By Sturtevant & Mason
Attorneys

Patented May 18, 1926.

1,584,778

UNITED STATES PATENT OFFICE.

HARRY T. KINGSBURY, OF KEENE, NEW HAMPSHIRE.

TOY WHEEL.

Application filed May 26, 1922. Serial No. 563,786.

My invention relates to an improvement in wheels for toy automobiles, and other toy vehicles.

The object of the invention is to provide a simple and durable rubber tread wheel, which may be manufactured at a minimum cost.

The invention consists, therefore, of a toy wheel comprising a plain metal disk with a rubber rim or tire vulcanized thereon.

In the accompanying drawings which illustrate the invention—

Figure 5:
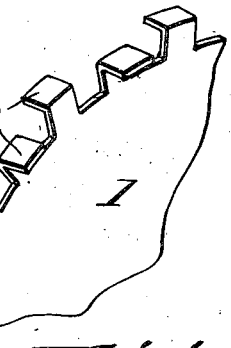

Fig. 5 a perspective view of still another modification; and

Figure 6:
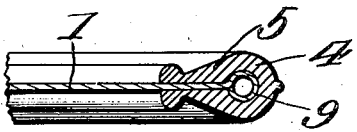

Fig. 6 of another alternative form.

In the drawings—

1 represents a plain flat disk of sheet metal, preferably steel, having a central opening in which is mounted and riveted a stud 2, with a central opening 3 for the wheel axle.

The disk is placed in a mold and an annulus of rubber molded about the outer periphery, the rubber annulus having a thickened tread portion 4, and the portion 5 which overlap and are vulcanized to the outer peripheral portion of the steel disk.

Figure 1:
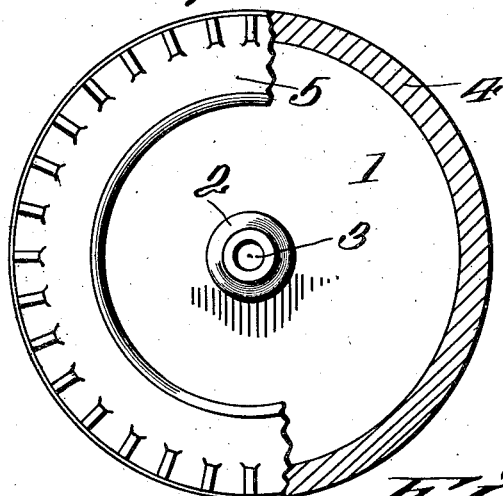
Figure 1 is a side view, with the tire or rim broken away.
Figure 3:
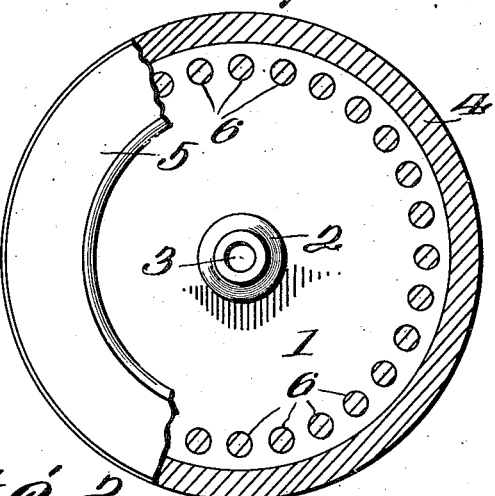
Fig. 3 is a side view of another form of disk.
Figure 2:
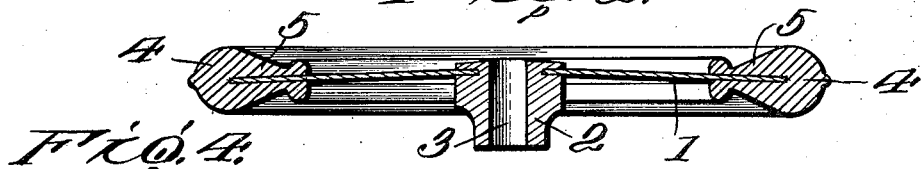
Fig. 2 is a vertical section.

In Fig. 3, the disk 1 has near its outer periphery, a series of openings 6 into which the portion 5 of the rubber will protrude when vulcanized.

Figure 4:
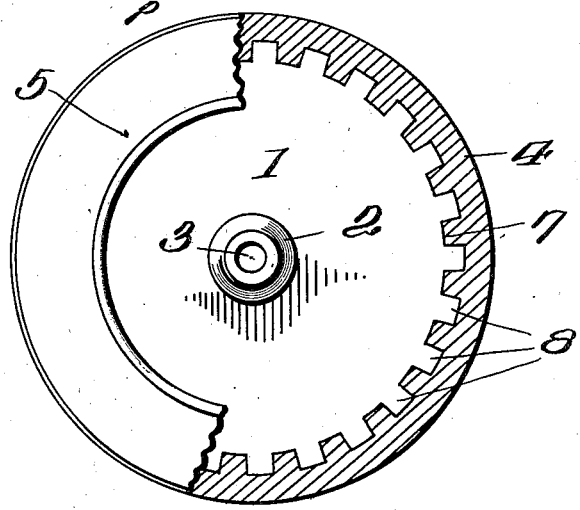
Fig. 4 is a side view of still another form of disk.

In Fig. 4 the periphery of the disk 1 is notched as at 7 to form teeth 8.

In Fig. 5 the teeth 8 are alternately bent laterally in opposite directions, these being embedded into the rubber tread when the latter is molded on to the disk.

In Fig. 6 the disk itself is provided with a tubular section 9 at the periphery. This is of advantage on a large size wheel and gives less weight and saves rubber.

Having thus described my invention, what I claim as new and desire to secure by Letters Patent, is:

1. A wheel for toys composed of a disk of sheet metal or the like, and a rubber tread portion simulating an automobile tire casing with thickened tread portion and molded around the outer periphery of the disk and vulcanized thereto, said disk extending into said thickened tread portion to a point presenting substantially a uniform thickness of rubber between its periphery and the tread surface.

2. A wheel for toys composed of a disk of sheet metal or the like, and a rubber tread portion simulating an automobile tire casing with a thickened tread portion and a bead portion at the free edge of the rubber, said tread portion being molded around the outer periphery of the disk and vulcanized thereto, said disk extending into said thickened tread portion to a point presenting substantially a uniform thickness of rubber between its periphery and the tread surface.

In testimony whereof, I affix my signature.

HARRY T. KINGSBURY.